(12) United States Patent
Shen, IV et al.

(10) Patent No.: US 10,218,526 B2
(45) Date of Patent: *Feb. 26, 2019

(54) DISTRIBUTED MULTICAST BY ENDPOINTS

(71) Applicant: Nicira, Inc., Palo Alto, CA (US)

(72) Inventors: Jianjun Shen, IV, Beijing (CN); Alexander Tessmer, Mountain View, CA (US); Ram Dular Singh, San Jose, CA (US); Hua Wang, Beijing (CN); Da Wan, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,749

(22) Filed: Jan. 31, 2018

(65) Prior Publication Data

US 2018/0159696 A1 Jun. 7, 2018

Related U.S. Application Data

(63) Continuation of application No. 15/232,621, filed on Aug. 9, 2016, now Pat. No. 9,887,851, which is a
(Continued)

(51) Int. Cl.
*H04L 12/18* (2006.01)
*H04L 12/46* (2006.01)
*H04L 12/761* (2013.01)

(52) U.S. Cl.
CPC ........ *H04L 12/1886* (2013.01); *H04L 12/185* (2013.01); *H04L 12/1854* (2013.01);
(Continued)

(58) Field of Classification Search
CPC . H04L 12/1886; H04L 12/1854; H04L 12/46; H04L 12/185; H04L 12/4641; H04L 45/16
See application file for complete search history.

(56) References Cited

U.S. PATENT DOCUMENTS 5,224,100 A 6/1993 Lee et al.
5,331,634 A 7/1994 Fischer
(Continued)

FOREIGN PATENT DOCUMENTS

AU 2014201767 B2 8/2015
AU 2015261640 B2 6/2017
(Continued)

OTHER PUBLICATIONS

Non-Published Commonly owned U.S. Appl. No. 15/726,335, filed Oct. 5, 2017, 62 pages, Nicira, Inc.
(Continued)

*Primary Examiner* — Shailendra Kumar
(74) *Attorney, Agent, or Firm* — Adeli LLP

(57) ABSTRACT

A novel method of conducting multicast traffic in a network is provided. The network includes multiple endpoints that receive messages from the network and generate messages for the network. The endpoints are located in different segments of the network, each segment including one or more of the endpoints. For a source endpoint to replicate a particular message (e.g., a data packet) for all endpoints belonging to a particular replication group (i.e., multicast group) within the network, the source endpoint replicates the particular message to each endpoint within the source endpoint's own segment and to a proxy endpoint in each of the other segments. Each proxy endpoint in turn replicates the particular message to all endpoints belonging to the particular replication group within the proxy endpoint's own segment.

20 Claims, 11 Drawing Sheets

Related U.S. Application Data continuation of application No. 14/020,369, filed on Sep. 6, 2013, now Pat. No. 9,432,204.

(60) Provisional application No. 61/869,704, filed on Aug. 24, 2013.

(52) U.S. Cl.
CPC .......... *H04L 12/46* (2013.01); *H04L 12/4641* (2013.01); *H04L 45/16* (2013.01)

(56) References Cited

U.S. PATENT DOCUMENTS

| | | | |
|---|---|---|---|
| 5,729,685 A | 3/1998 | Chatwani et al. | |
| 5,831,975 A | 11/1998 | Chen et al. | |
| 5,926,463 A | 7/1999 | Ahearn et al. | |
| 6,104,699 A | 8/2000 | Holender et al. | |
| 6,181,697 B1 | 1/2001 | Nurenberg et al. | |
| 6,192,417 B1 | 2/2001 | Block et al. | |
| 6,728,777 B1 | 4/2004 | Lee et al. | |
| 6,804,263 B1 | 10/2004 | Okawa | |
| 6,836,481 B1 | 12/2004 | Hotta | |
| 6,862,263 B1 | 3/2005 | Simmons | |
| 6,901,510 B1 | 5/2005 | Srivastava | |
| 6,917,985 B2 | 7/2005 | Madruga et al. | |
| 6,934,252 B2 | 8/2005 | Mehrotra et al. | |
| 6,950,428 B1 | 9/2005 | Horst et al. | |
| 7,046,630 B2 | 5/2006 | Abe et al. | |
| 7,209,439 B2 | 4/2007 | Rawlins et al. | |
| 7,286,490 B2 | 10/2007 | Saleh et al. | |
| 7,333,487 B2 | 2/2008 | Novaes | |
| 7,529,199 B1 | 5/2009 | Wijnands et al. | |
| 7,606,187 B2 | 10/2009 | Zeng et al. | |
| 7,792,099 B2 | 9/2010 | Yasukawa et al. | |
| 7,792,987 B1 | 9/2010 | Vohra et al. | |
| 7,813,340 B2 | 10/2010 | Novaes | |
| 7,876,754 B2 | 1/2011 | Novaes | |
| 7,937,438 B1 | 5/2011 | Miller et al. | |
| 7,961,646 B2 | 6/2011 | Liu et al. | |
| 8,089,964 B2 | 1/2012 | Lo et al. | |
| 8,223,649 B2 | 7/2012 | Rangarajan et al. | |
| 8,224,971 B1 | 7/2012 | Miller et al. | |
| 8,310,957 B1 | 11/2012 | Rekhter | |
| 8,312,129 B1 | 11/2012 | Miller et al. | |
| 8,391,185 B2 | 3/2013 | Wijnands et al. | |
| 8,553,689 B2 | 10/2013 | Bachmann et al. | |
| 8,612,627 B1 | 12/2013 | Brandwine | |
| 8,625,603 B1 | 1/2014 | Ramakrishnan et al. | |
| 9,432,204 B2 | 8/2016 | Shen et al. | |
| 9,602,385 B2 | 3/2017 | Tessmer et al. | |
| 9,602,392 B2 | 3/2017 | Tessmer et al. | |
| 9,794,079 B2 | 10/2017 | Tessmer et al. | |
| 9,887,851 B2 | 2/2018 | Shen et al. | |
| 2002/0138618 A1 | 9/2002 | Szabo | |
| 2004/0267897 A1 | 12/2004 | Hill et al. | |
| 2005/0111474 A1 | 5/2005 | Kobayashi | |
| 2005/0147095 A1 | 7/2005 | Guerrero et al. | |
| 2006/0045092 A1 | 3/2006 | Kubsch et al. | |
| 2006/0182033 A1 | 8/2006 | Chen et al. | |
| 2006/0187950 A1 | 8/2006 | Bou-Diab et al. | |
| 2006/0239290 A1 | 10/2006 | Lin et al. | |
| 2007/0058638 A1 | 3/2007 | Guichard et al. | |
| 2008/0002727 A1 | 1/2008 | Yamane | |
| 2008/0020758 A1 | 1/2008 | Nagarajan et al. | |
| 2008/0059556 A1 | 3/2008 | Greenspan et al. | |
| 2008/0071900 A1 | 3/2008 | Hecker et al. | |
| 2008/0104273 A1 | 5/2008 | Bruck et al. | |
| 2008/0175239 A1 | 7/2008 | Sistanizadeh et al. | |
| 2008/0186962 A1 | 8/2008 | Sinha | |
| 2008/0205302 A1 | 8/2008 | Florit et al. | |
| 2008/0212496 A1 | 9/2008 | Zou | |
| 2009/0285206 A1 | 11/2009 | Kawauchi et al. | |
| 2010/0002698 A1* | 1/2010 | Clack | H04L 12/1836 370/390 |
| 2010/0106779 A1 | 4/2010 | Yamauchi | |
| 2010/0157888 A1 | 6/2010 | Aggarwal et al. | |
| 2010/0157889 A1 | 6/2010 | Aggarwal et al. | |
| 2010/0271948 A1 | 10/2010 | Challapali et al. | |
| 2010/0284402 A1 | 11/2010 | Narayanan | |
| 2011/0022652 A1* | 1/2011 | Lai | H04L 67/104 709/202 |
| 2011/0075664 A1 | 3/2011 | Lambeth et al. | |
| 2011/0202920 A1 | 8/2011 | Takase | |
| 2011/0280572 A1 | 11/2011 | Vobbilisetty et al. | |
| 2011/0317696 A1 | 12/2011 | Aldrin et al. | |
| 2012/0106950 A1 | 5/2012 | Madrahalli et al. | |
| 2012/0155322 A1 | 6/2012 | Lamba et al. | |
| 2012/0177042 A1 | 7/2012 | Berman | |
| 2012/0185553 A1 | 7/2012 | Nelson | |
| 2012/0233326 A1 | 9/2012 | Shaffer et al. | |
| 2012/0236734 A1 | 9/2012 | Sampath et al. | |
| 2012/0278804 A1 | 11/2012 | Narayanasamy et al. | |
| 2012/0307826 A1 | 12/2012 | Matsuoka | |
| 2013/0040677 A1 | 2/2013 | Lee et al. | |
| 2013/0114597 A1* | 5/2013 | Ogisawa | H04L 12/185 370/390 |
| 2013/0124750 A1 | 5/2013 | Anumala et al. | |
| 2013/0159826 A1 | 6/2013 | Mason et al. | |
| 2013/0266015 A1 | 10/2013 | Qu et al. | |
| 2013/0318219 A1 | 11/2013 | Kancherla | |
| 2014/0052877 A1* | 2/2014 | Mao | H04L 61/103 709/245 |
| 2014/0098814 A1* | 4/2014 | Bansal | G06F 9/542 370/390 |
| 2014/0169366 A1* | 6/2014 | Kotalwar | H04L 12/185 370/390 |
| 2014/0192804 A1* | 7/2014 | Ghanwani | H04L 49/70 370/390 |
| 2014/0195666 A1 | 7/2014 | Dumitriu et al. | |
| 2014/0372624 A1* | 12/2014 | Wang | H04L 65/60 709/231 |
| 2015/0055651 A1 | 2/2015 | Shen et al. | |
| 2015/0131655 A1 | 5/2015 | Dayama et al. | |
| 2015/0147095 A1 | 5/2015 | Iketani | |
| 2015/0163100 A1 | 6/2015 | Graf et al. | |
| 2015/0172132 A1 | 6/2015 | Tessmer et al. | |
| 2015/0172165 A1 | 6/2015 | Tessmer et al. | |
| 2016/0352531 A1 | 12/2016 | Shen et al. | |
| 2017/0171061 A1 | 6/2017 | Tessmer et al. | |

FOREIGN PATENT DOCUMENTS

| | | |
|---|---|---|
| CN | 101282338 B | 8/2011 |
| EP | 1855420 A1 | 11/2007 |
| EP | 2840736 B1 | 9/2016 |
| EP | 3113413 A1 | 1/2017 |
| GB | 2458154 A | 9/2009 |
| JP | 2001230774 A | 8/2001 |
| JP | 2005184234 A | 7/2005 |
| JP | 2006121517 A | 5/2006 |
| JP | 2006229967 A | 8/2006 |
| JP | 2009272803 A | 11/2009 |
| JP | 2010103757 A | 5/2010 |
| JP | 2011171874 A | 9/2011 |
| WO | 2004082221 A1 | 9/2004 |
| WO | 2006095391 A1 | 9/2006 |
| WO | 2013009850 A1 | 1/2013 |
| WO | 2015152976 A1 | 10/2015 |

OTHER PUBLICATIONS

Casado, Martin, et al. "Ethane: Taking Control of the Enterprise," SIGCOMM'07, Aug. 27-31, 2007, 12 pages, ACM, Kyoto, Japan.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dumitriu, Dan Mihai, et al. (U.S. Appl. No. 61/514,990), filed Aug. 4, 2011, 31 pages.

(56) References Cited

OTHER PUBLICATIONS

Gross, J., et al., "Geneve: Generic Network Virtualization Encapsulation," Feb. 14, 2014, 24 pages, Internet Engineering Task Force (IETF).
Narten, Thomas, et al., "Address Resolution Problems in Large Data Center Networks," Jan. 2013, 17 pages, Internet Engineering Task Force (IETF).

* cited by examiner

DISTRIBUTED MULTICAST BY ENDPOINTS

CLAIM OF BENEFIT TO PRIOR APPLICATIONS

This application is a continuation application of U.S. patent application Ser. No. 15/232,621, filed Aug. 9, 2016, now published as U.S. Patent Publication 2016/0352531. U.S. patent application Ser. No. 15/232,621 is a continuation application of U.S. patent application Ser. No. 14/020,369, filed Sep. 6, 2013, now issued as U.S. Pat. No. 9,432,204. U.S. patent application Ser. No. 14/020,369 claims the benefit of U.S. Provisional Patent Application 61/869,704, filed Aug. 24, 2013. U.S. Provisional Patent Application 61/869,704, U.S. Patent Publication 2016/0352531 and U.S. Pat. No. 9,432,204 are incorporated herein by reference.

BACKGROUND

Multicast is the delivery of a message or information to a group of destination computers simultaneously in a single transmission from the source. Copies of the message are automatically replicated and forwarded by other network elements. Forwarding and replicating multicast packets are usually done by intermediate nodes in the network—switches fulfill multicast forwarding inside a layer 2 network while (multicast) routers fulfill multicast routing across layer 3 networks. Typically, switches that support multicast use IGMP (Internet Group Management Protocol) snooping, while routers that support multicast use PIM (Protocol Independent Multicast) as the routing protocol.

Though previously not very many applications use multicast, many IP multicast applications have been developed and deployed like financial software, video service, etc. A use case worth noting is overlay based network virtualization (layer 2 tunneling), with VXLAN to be an important technology proposed. VXLAN can support a large number of logical layer 2 networks over a physical IP network. It is based on MAC-over-UDP encapsulation, and requires an IP multicast group to be allocated for encapsulation of BUM (broadcast, unknown unicast, and multicast) traffic inside a logical network. As a result, a large number of multicast groups may be consumed, especially in a cloud environment in which each tenant may create a number of logical networks. These created logical networks and corresponding multicast groups may span across physical layer 3 networks and even datacenters.

Unfortunately, use of IP multicast is limited by lack of infrastructure to support it. Low end switches and routers usually do not support IGMP and PIM, and they usually do not support a large number of multicast groups. Moreover, even when the physical network hardware has the capabilities to support multicast, users generally eschew enabling multicast in the datacenter networks due to the complexity in the manageability and the scalability of IP multicast. Enabling multicast across datacenters and provider networks is even more difficult.

What is needed is a network system for enabling a large number of multicast groups across physical networks that may include data centers or provider networks. Such a network system should support network virtualization without relying on built-in multicast capabilities of the physical network, while nevertheless leverage the multicast capabilities offered by the physical network to achieve higher efficiency, even when multicast is not fully enabled in the physical network.

SUMMARY

Some embodiments of the invention provide a method for performing replication of messages across a network to a selected group of endpoints (i.e., multicast replication). The network includes multiple endpoints that receive messages from the network and generate messages for the network. The endpoints are located in different segments of the network, each segment including one or more of the endpoints. For a source endpoint to replicate a particular message (e.g., a data packet) to all endpoints belonging to a particular replication group (i.e., multicast group) within the network, the source endpoint replicates the particular message to each endpoint within the source endpoint's own segment and to a proxy endpoint in each of the other segments. Each proxy endpoint in turn replicates the particular message to all endpoints belonging to the particular replication group within the proxy endpoint's own segment.

In some embodiments, multicast replication by endpoints is performed into three steps: (1) local replication in the source segment, in which a multicast packet is sent to local receiver endpoints in the same segment with the sender; (2) cross segment replication, in which the packet is replicated to every remote segment that has receivers of the multicast group; (3) local replication in remote segments, in which the packet is sent to every receiver endpoint in a remote segment.

To obtain all of the relevant information for multicast replication, endpoints in some embodiments exchange information with each other. In some embodiments, endpoints exchange information in a distributed way using a control plane protocol with each other. In some embodiments, a set of separate entities (e.g. centralized controllers) collect information from endpoints and publish (proactively or in response to queries from endpoints) to endpoints the information about the physical network and other endpoints that is needed for an endpoint to perform multicast replication.

Some embodiments select proxies in a manner that balances the traffic load in the remote segments. In some embodiments, this is accomplished by choosing an endpoint from the pool by random for each multicast group. Some embodiments perform proxy selection intelligently by intentionally avoiding endpoints that are already busy In some embodiments, multicast replication is used to implement overlay based network virtualization solutions such as VXLAN. In an overlay network, logical layer 2 networks may be created on top of the physical network, and full messed layer 2 tunnels may be established between endpoints that join a same logical layer 2 network. In some embodiments, a BUM packet originating from one tunnel endpoint in the logical layer 2 network is replicated to all other member endpoints of the network.

In some embodiments, VMs are consumers of the logical layer 2 networks, and hypervisors are tunnel endpoints. Some of these embodiments map the scope of a multicast replication operation (i.e., a multicast group) to a logical layer 2 network and multicast endpoints to tunnel endpoints. As such, BUM packet replication in a logical network is implemented as multicast replication to a multicast group in the physical network. In other words, the replication scope of a logical network in these embodiments is mapped to include only the receiver endpoints of a multicast group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for performing replication of messages across a network to a selected group of endpoints (i.e., multicast replication). The network includes multiple endpoints that receive messages from the network and generate messages for the network. The endpoints are located in different segments of the network, each segment including one or more of the endpoints. For a source endpoint to replicate a particular message (e.g., a data packet) for all endpoints belonging to a particular replication group (i.e., multicast group) within the network, the source endpoint replicates the particular message to each endpoint within the source endpoint's own segment and to a proxy endpoint in each of the other segments. Each proxy endpoint in turn replicates the particular message to all endpoints belonging to the particular replication group within the proxy endpoint's own segment.

Figure 1:
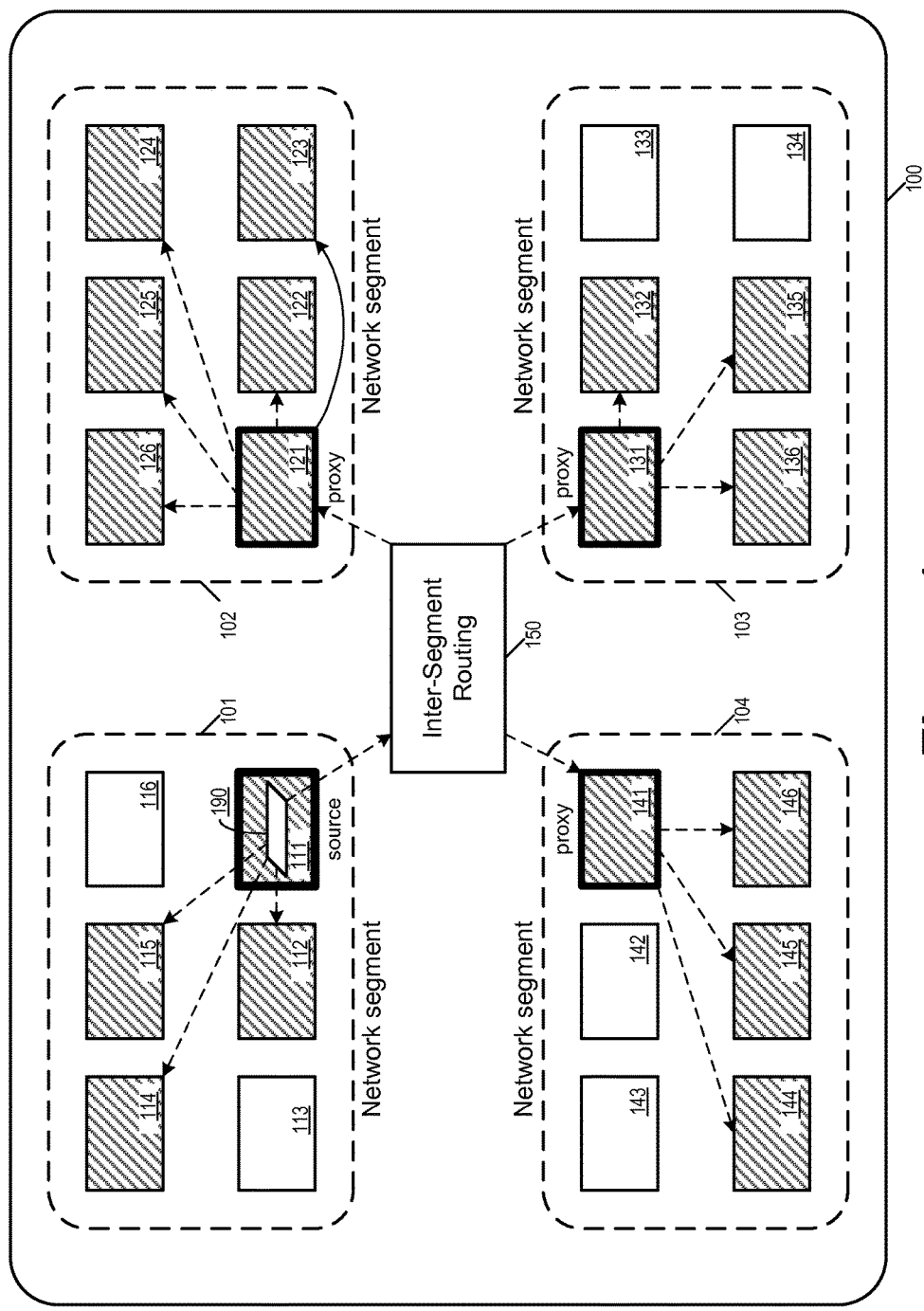
FIG. 1 illustrates a network in which an endpoint of a segment replicates a data packet to all endpoints of a particular replication group.

For some embodiments, FIG. 1 illustrates a network 100 in which an endpoint replicates a data packet to all endpoints of a particular replication group across different segments of the network. The network 100 is divided into segments. The endpoint replicates a data packet to all endpoints of the particular replication group in its own segment. Proxies in other segments then replicate the data packet to other endpoints of the multicast group in other segments.

As illustrated, the network 100 is divided into at least four segments 101-104. Each of the network segments 101-104 includes a number of endpoints that generate and receive network data traffic. Specifically, the segment 101 includes endpoints 111-116, the segment 102 includes endpoints 121-126, the segment 103 includes endpoints 131-136, and the segment 104 includes endpoints 141-146. Data traffic between the segments goes through inter-segment routing 150.

FIG. 1 also illustrates the replication of a data packet 190 that is sourced by the endpoint 111. The data packet 190 is specified to be replicated to all member endpoints of a particular replication group. The members of this particular replication group includes endpoints 111, 112, 114, 115, 121, 122, 123, 124, 125, 126, 131, 132, 135, 136, 141, 144, 145, and 146. These endpoints are illustrated as shaded in FIG. 1. Endpoints that are not illustrated as shaded do not belong to the particular replication group. In some embodiments, the data packet 190 is not forwarded to those endpoints that do not belong to the replication group. It is worth noting that, not all endpoints of a segment belongs to the same replication group. For example, though all endpoints of network segment 102 belong to the particular replication group, only some of the endpoints in network segment 101 do (same goes for endpoints in network segments 103 and 104). In some embodiments, these other endpoints may belong to other replication groups. Some endpoints belong to more than one replication groups.

The source endpoint 111 is in the network segment 101, and the endpoint replicates the data packet to other members of the replication group within the network segment 101, namely to endpoints 112, 114, and 115. The same data packet is also replicated to endpoints in network segments 102, 103, and 104. However, the source endpoint 111 does not forward the data packet 190 directly to endpoints in these other network segments. Instead, the source endpoint 111 forwards the replication data packet 190 to a proxy endpoint in each of these other network segments. Specifically, the source endpoint 111 has chosen the endpoint 121 as the proxy for the network segment 102, the endpoint 131 as the proxy for the network segment 103, and the endpoint 141 as the proxy for the network segment 104. Each of these proxies in turn replicates and forwards the data packet 190 to endpoints belonging to the particular replication group within each respective network segments, (e.g., the proxy 141 forward the data packet 190 to endpoints 141, 144, 145, and 146.) The selection of proxy endpoints will be further described in Section III below.

The use of the proxies in different network segments allows the source endpoint 111 to forward the data packet 190 to endpoints in other network segments without having to expend computing resources in order to reach endpoints in remote segment. It also allows the replication and forwarding of messages to fully utilize the local network structure of each network segment, some of which has hardware configured to support multicast in some embodiments. Doing so leverages the multicast capabilities offered by the physical network to achieve higher efficiency while supporting optimized replication and delivery paths based on the physical network topology.

The network 100 provides the physical infrastructure for data communication between entities that are connected to the network 100. In some embodiments, the network 100 includes numerous physically distinct sets of communication pathways that are communicatively interlinked to form the network 100. In some embodiments, at least some of these physically distinct sets of communication pathways have different topologies and/or use different communication protocols. In some embodiments, the network 100 spans across one or more data centers and/or (internet service) provider networks such that at least some of the physically distinct sets of communication pathways are in the data centers or provider networks. In some embodiments, the network 100 is a physical IP network that may be divided into multiple physical layer 2's (VLANs), IP subnets, and multicast islands. Multicast forwarding is supported inside a multicast island, but is not supported (or could not be done at good enough performance) across islands. In some embodiments, multicast is not supported by the network at all.

A network endpoint such as 111 in some embodiments is an entity that generates and receives data traffic on the network 100. Such an entity can be a computing device, data storage, or a device of another type that provides or consumes data traffic on the network.

A network endpoint that replicates and forwards messages to multiple recipients is referred to as a multicast endpoint. In some embodiments, a multicast endpoint performs multicast replication itself in different modes depending on physical network topology and multicast capabilities. In some embodiments, a multicast endpoint can be a hypervisor that sends and receives multicast traffic to and from a physical network on behalf of its virtual machines (VMs) running on a host machine.

In some embodiments, a multicast endpoint can be an entity in a network segment that does not generate and consume multicast traffic. Some of these multicast endpoints intercepts locally originated multicast traffic and replicates the intercepted traffic to multicast endpoints of remote segments and receives multicast traffic from remote segments and injects the received traffic to the local segment.

A network segment such as the segments 101-104 is a subset of the network which encompasses a collection of endpoints. In some embodiments, each network segment is able to support multicast traffic between the encompassed multicast endpoints. In some embodiments, at least some of the network segments do not support multicast traffic and must rely on unicast to replicate and forward multicast packets to each receiver endpoint in the multicast group.

Multicast messages are replicated and forwarded differently among endpoints of a same segment than between endpoints across different segments. For example, in some embodiments, cost of network communication between endpoints of a same segment is less than between endpoints in different segments. In some embodiments, the network supports higher communication bandwidth between endpoints of a same segment than between endpoints in different segments. In some embodiments, a segment is defined by the multicast capabilities of the physical network. In some of these embodiments, multicast traffic (sending network traffic to multiple recipients at the same time) within a segment can reliably utilize the multicast capability of the physical network, while multicast traffic across segments are either not supported by the physical network at all or are supported in a more limited fashion.

In some embodiments, a segment can be a VLAN (Virtual Local Area Network) or an IP subnet inside a VLAN. (In some embodiments, a VLAN contains only one IP subnet. In some embodiments, multiple IP subnets are allocated in a VLAN.) In some embodiments, a network segment includes a set of adjacent VLANs that have high bandwidth and/or low cost links between each other.

In some embodiments, a segment is a "multicast island". In some embodiments, a multicast island is a physical network that supports IP-multicast, or a physical network in which all routers support multicast routing protocols. In some embodiments, a segment is a multicast island that is a VLAN, in which IGMP snooping is supported by switches while multicast routing is not supported by the routers, and hence multicast forwarding is limited to be inside a VLAN. In some embodiments, a multicast island includes multiple VLANs and subnets. Such a multicast island in some embodiments includes internal routers (or layer 3 switches) that support multicast routing, so multicast traffic can be routed among the internal VLANs, but cannot be routed out of the island or into the island from the outside.

The inter-segment routing 150 includes portions of the network 100 that provides communication pathways among the different network segments 101-104. In some embodiments, the multicast traffic that takes place within each network segment cannot be directly routed across the inter-segment routing 150, or cannot be routed over without incurring additional cost in terms of time, bandwidth or computing power. In some embodiments, the inter-segment routing 150 includes data centers or provider networks that do not allow multicast traffic. In some of these embodiments, the multicast traffic of one segment can only propagate through the inter-segment routing 150 as unicast traffic, specifically to proxy endpoints in different segments.

The above description introduces distributed multicast replication by endpoints of some embodiments. Several more detailed embodiments are described below. First, Section I describes in further detail multicast replication by endpoints of some embodiments, while Section II describes the collection and the exchange of information necessary for supporting distributed multicast replication according to some embodiments. Next, Section III describes the selection of proxy endpoints and the balancing of network load according to some embodiments. Section IV describes some embodiments of network virtualization schemes based on the distributed multicast replication as described in other sections. Finally, Section V describes an electronic system with which some embodiments of the invention are implemented.

I. Multicast Replication by Endpoints

In some embodiments, multicast replication by endpoints includes the following three steps: (1) local replication in the source segment, in which a multicast packet is sent to local receiver endpoints in the same segment with the sender; (2) cross segment replication, in which the packet is replicated to every remote segment that has receivers of the multicast group; (3) local replication in remote segments, in which the packet is sent to every receiver endpoint in a remote segment.

Steps (1) and (2) are initiated by sender endpoints. In step (2), the sender endpoint chooses one endpoint in every remote receiving segment to be a proxy before replicating a multicast packet, and then replicates the packet to every proxy endpoint with unicast. After receiving the replicated packet, a proxy will continue the replication procedure to the step (3).

Figure 2:
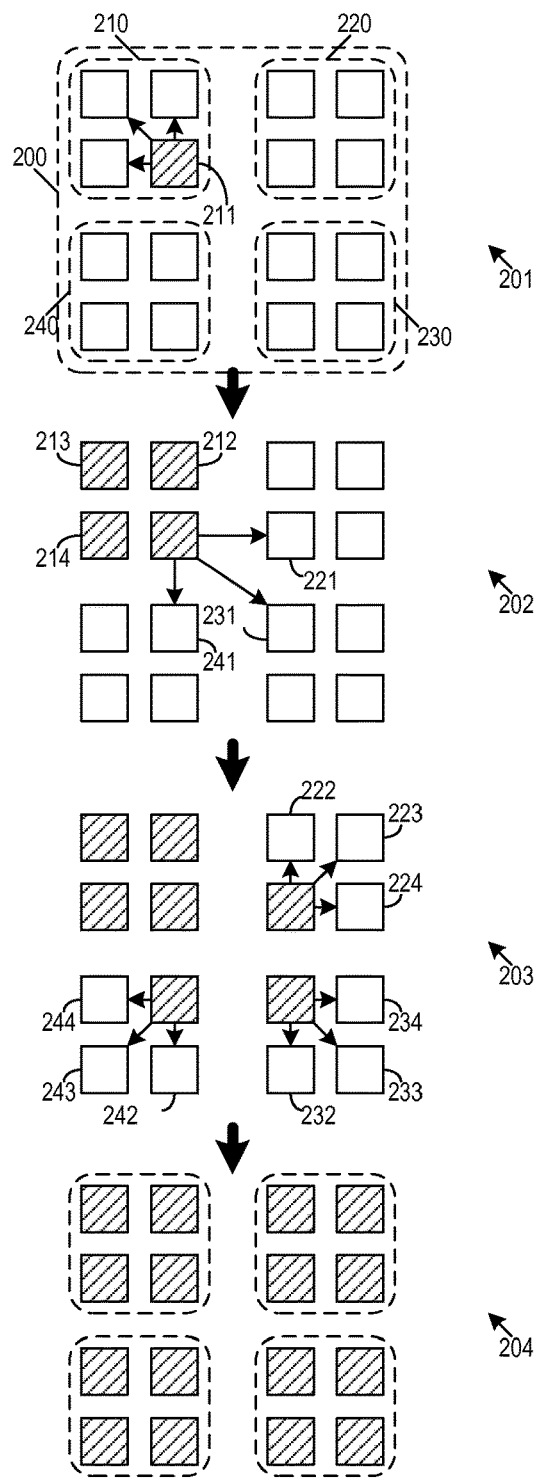
FIG. 2 illustrates the propagation of multicast traffic from one network segment to other network segments by the use of proxies.

FIG. 2 illustrates the propagation of multicast traffic from one network segment to other network segments by the use of proxies. Specifically, FIG. 2 illustrates the local replication in the source segment, the cross segment replication, and the local replication in remote segments in a network 200. As illustrated, the network 200 includes four segments 210, 220, 230, and 240, the segment 210 having endpoints 211-214, the segment 220 having endpoints 221-224, the segment 230 having endpoints 231-234, and the segment 240 having endpoints 241-244. Furthermore, the source endpoint 211 has chosen endpoints 221, 231, and 241 as proxies for replicating and forward multicast message for remote segments 220, 230, and 240, respectively. For purpose of illustrative simplicity, all of the endpoints are illustrated as belonging to a same particular multicast group, though one of ordinary skill would understand that some of segments may include endpoints that do not belong to the same multicast group.

In four stages 201-204, FIG. 2 illustrates the replication and the forwarding of a multicast message from a source endpoint 211 to all endpoints of the same multicast group in segments 210, 220, 230, and 240. At each stage, an endpoint that has received the multicast message/data packet is illustrated as shaded.

At the first stage 201, the source endpoint 211 forwarded a data packet by multicast to all other endpoints belonging to the same multicast group within the local network segment 210 (which is the network segment of the source end point). In some embodiments, this replication and forwarding is accomplished by utilizing the multicast capabilities of the physical network underlying the network segment 210.

The second stage 202 shows the cross segment replication, in which the packet is replicated to every remote segment that has receiver endpoints of the multicast group. Specifically, the source endpoint 211 is replicating and forwarding the data packet to proxy endpoints 221, 231, and 241 that are in remote segments 220, 230, and 240, respectively. In some embodiments, the cross segment replication takes place across physical communication pathways that are configured for multicast and does utilize the available built-in multicast capabilities. However, in some embodiments, this cross segment replication takes place across physical communication pathways that are not configured for multicast. In some of these embodiments, the forwarding of the multicast packet from one segment to another is performed by unicast communications protocols.

The third stage 203 shows the local replication in remote segments, in which the packet is sent to every receiver endpoint in a remote segment. Specifically, this replication is performed by proxy endpoints in each of those remote segments. Namely, the endpoint 221, selected as the proxy for the segment 220, replicates and forwards the packet to endpoints 222-224. Likewise, the endpoint 231 as the proxy for the segment 230 replicates and forwards the packet to endpoints 232-234, and the endpoint 241 as the proxy for the segment 240 replicates and forwards the packet to endpoints 242-244. In some embodiments, the replication and forwarding of the multicast packet in some of these remote segments is accomplished by utilizing the multicast capabilities of the physical network underlying these remote network segments. The fourth and final stage 204 shows the completion of the replication and forwarding of the data packet, in which every endpoint in the multicast group has received the data packet.

As mentioned, in some embodiments, multicast replication in a segment is accomplished by local multicast replication supported by the underlying physical network for the segment. In some embodiments, this is so when the segment is a multicast island such that the sender/proxy endpoint sends out a multicast packet which will be replicated by the physical network to every receiver of the multicast group in the local multicast island. In some embodiments, a multicast island does not allow a multicast packet to leave the island, and the sender endpoint would send the original packet out of the island without using multicast (e.g., by using unicast). Some embodiments prevent the multicast packet from being forwarded outside the segment by forcing routers to drop the multicast packet, even if the router supports multicast.

Figure 3:
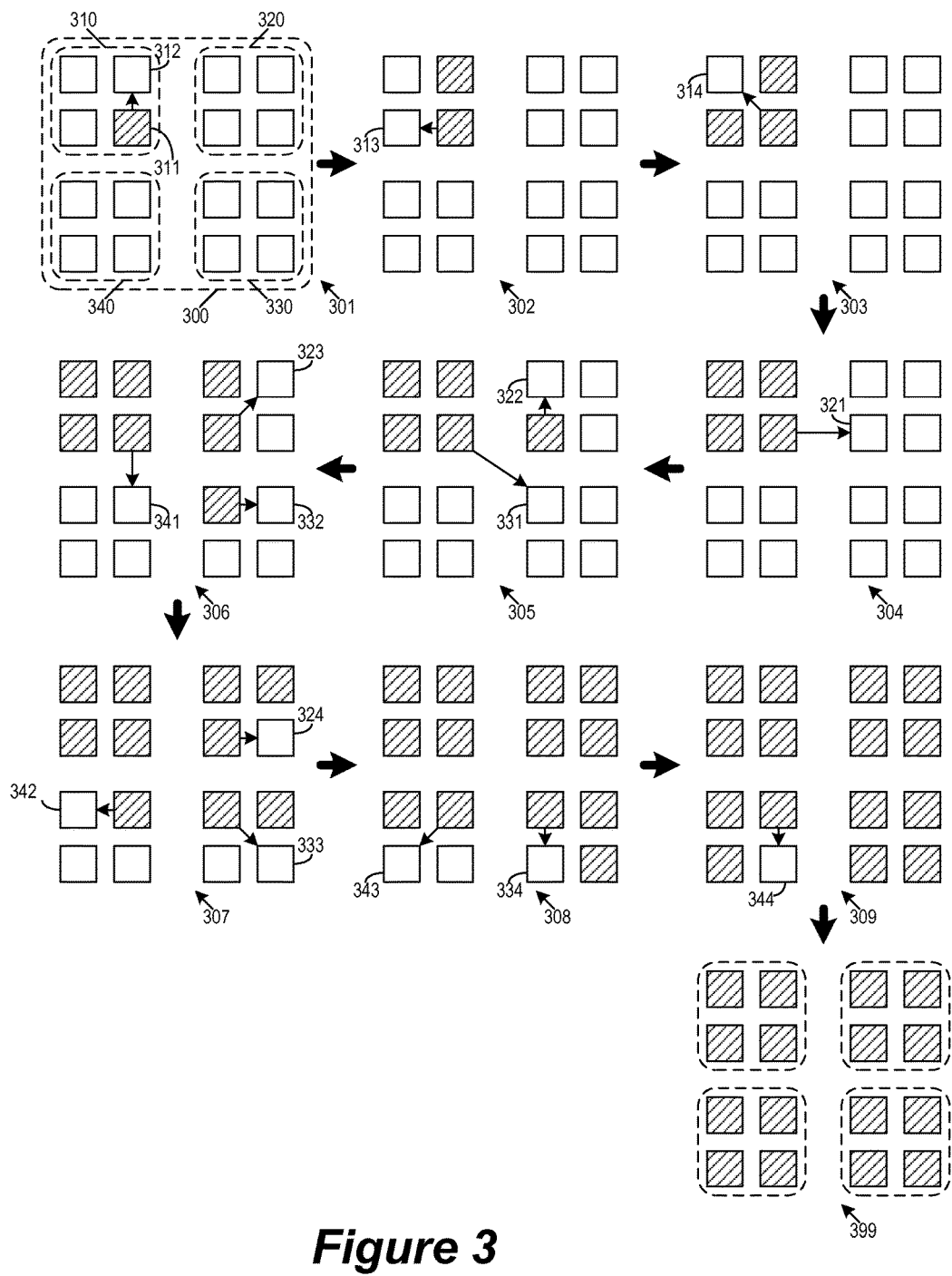
FIG. 3 illustrates a network that uses unicast replication by endpoints to implement multicast in local segments.

In some embodiments, at least some of the segments do not support multicast protocols locally. In some of these embodiments, the sender/proxy endpoint replicates the original multicast packet to every local receiver endpoint with unicast. So for each local receiver, the sender/proxy replicates the original packet and converts it to a unicast packet to the receiver endpoint. FIG. 3 illustrates a network 300 that uses unicast replication by endpoints to implement multicast in local segments.

As illustrated, the network 300 has four network segments 310, 320, 330, and 340, the segment 310 having endpoints 311-314, the segment 320 having endpoints 321-324, the segment 330 having endpoints 331-334, and the segment 340 having endpoints 341-344. The source endpoint 311 has chosen endpoints 321, 331, and 341 as proxies for replicating and forward multicast message for remote segments 320, 330, and 340, respectively. For purpose of illustrative simplicity, all of the endpoints are illustrated as belonging to a same particular multicast group, though one of ordinary skill would understand that some of segments may include endpoints that do not belong to the same multicast group.

FIG. 3 illustrates the unicast replication in local segments in ten stages 301-309 and 399. The first stage 301 illustrates the source endpoint 311 replicating and forwarding a data packet by unicast to endpoint 312. The segment 310 does not support multicast protocols, and therefore multicast traffic to multiple endpoints within the segment 310 must be implemented by unicast transmission to individual endpoints of the same multicast group. In some embodiments in which the receiver endpoint is in the same VLAN as the sender endpoint (or proxy), the destination MAC address is changed to be the receiver endpoint's MAC address.

In order to complete the multicast replication and forwarding of data packet to remaining members of the multicast group in the segment 310, the source endpoints perform unicast forwarding to endpoints 313 and 314. The second stage 302 and the third stage 303 illustrate the unicast forwarding to endpoints 313 and 314, respectively.

The fourth stage 304 illustrates a cross segment message replication/forwarding from the source endpoint 311 in the segment 310 to the chosen proxy endpoint 321 for the segment 320. The example of FIG. 3 illustrates the cross segment forwarding as performed by unicast. However, in some embodiments, the cross segment forwarding is performed by multicast from the source endpoint to all of the proxies if the physical communication pathways underlying the cross segment communication supports multicast.

The fifth stage 305 illustrates a cross segment message replication/forwarding from the source endpoint 311 to the chosen proxy endpoint 331 for the segment 330. The stage 305 also illustrates the start of message replication/forwarding by the proxy 321 to endpoints in the segments 320.

The sixth stage 306 illustrates a cross segment message replication/forwarding from the source endpoint 311 to the chosen proxy endpoint 341 for the segment 340. In this stage, the proxy 321 continues to replicate/forward the message by unicast to endpoints in the segment 320, while the proxy 331 start to replicate/forward the message by unicast to endpoints in the segment 330.

At the seventh stage 307, the source endpoint 311 has completed sending the message to all of its destinations (i.e., all endpoints in its local segment 310 of the same multicast group as well as all proxy endpoints in remote segments), while proxies 321 and 331 continue to replicate and forward the data packet by unicast to endpoints of the same multicast group in their respective network segments. The proxy 341 starts to replicate/forward the message by unicast to endpoints in the segment 340.

The replication and forwarding by proxies continues in the eighth stages 308 and the ninth stage 309. The tenth and final stage 399 shows the completion of the replication and forwarding of the data packet, in which every endpoint in the multicast group has received the data packet.

Though FIGS. 2 and 3 illustrate the entire network as using either unicast or multicast to replicate/forward multicast messages, in some embodiments, the replication mode can be configured at per segment or event per endpoint granularity. For example, the network 100 of FIG. 1 can be configured such that the source endpoint 111 uses multicast to forward/replicate messages while the proxy endpoint 131 uses unicast. The network 100 can also be configured such that a first multicast group (e.g., the group represented by the shaded endpoints in FIG. 1) uses multicast while a second multicast group (not illustrated) uses unicast.

Replicating/forwarding of multicast packet by performing multicast requires multicast supported by the physical network inside the local segment. Doing so exploits the multicast capabilities of the physical network, which allows more efficient multicast forwarding and replication than relying on unicast by endpoints. When multicast is not available, replicating/forwarding of multicast packet by unicast (as illustrated in FIG. 3) is still advantageous as long as packet forwarding costs inside a segment is lower than forwarding cost outside the segment, and that replicated packets across segments are reduced by replicating only a single copy of the packet to the proxy of each remote segment.

Figure 4:
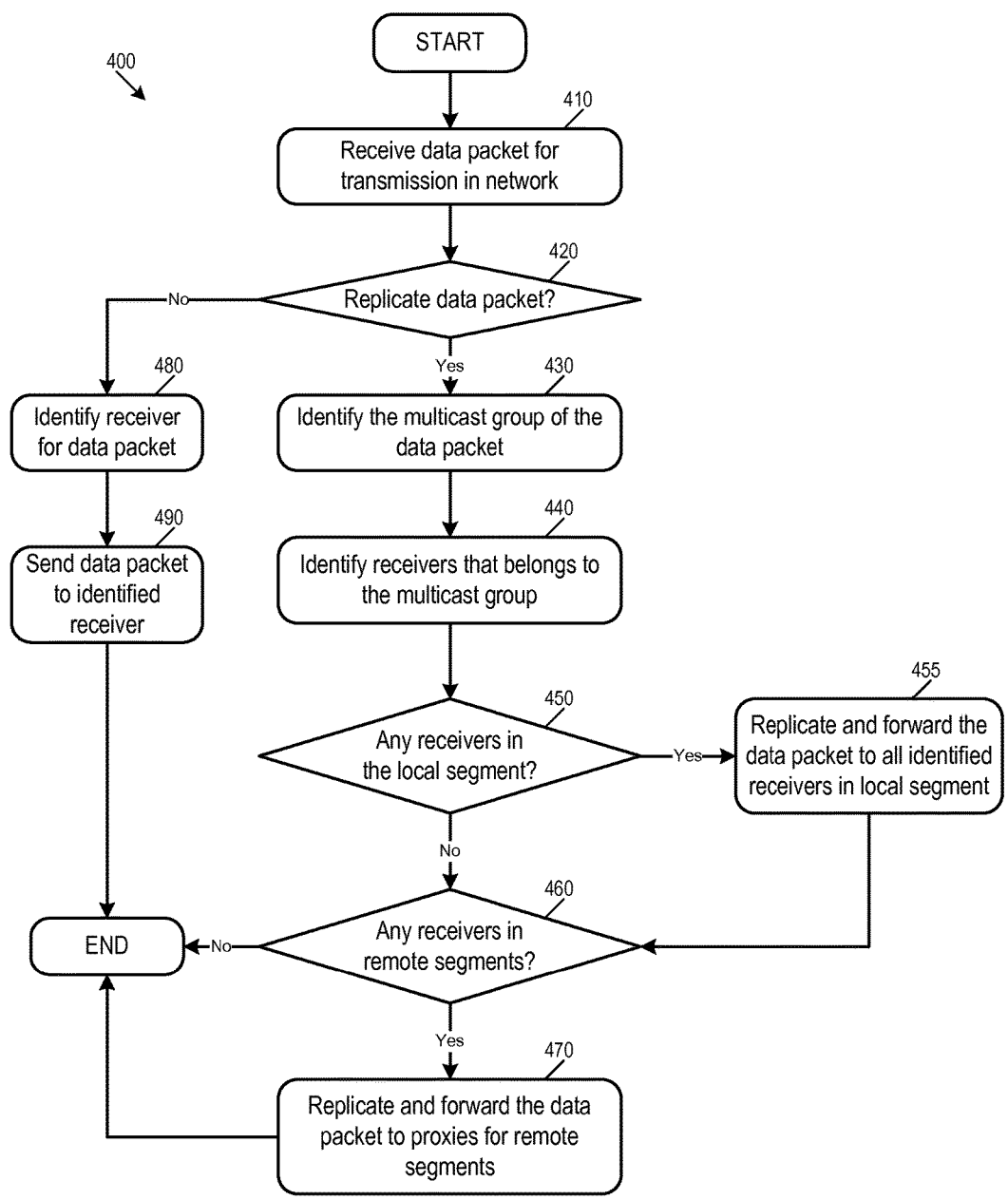
FIG. 4 conceptually illustrates a process for replicating/forwarding multicast packet in a network.

For some embodiments, FIG. 4 conceptually illustrates a process 400 performed by an endpoint when replicating/forwarding multicast packet in a network. The process starts when it receives (at 410) data packet for transmission in the network. This received data packet can be generated by an entity that is connected to the network through the endpoint, such as a computer running an application or a storage device providing data. The received data can also be from a data packet that the endpoint receives from the network.

The process then determines (at 420) whether to replicate the received data packet. For an endpoint that receives data originated from an entity that uses the endpoint to connect to the network, the endpoint can determine whether this data packet is destined for multiple recipients from information provided the source of the data. For an endpoint that receives data as a packet from the network, the process needs to determine whether the data packet is from a multicast group that uses the endpoint as a proxy to replicate and forward data packets. In some embodiments, a proxy endpoint distinguishes received packets that need further replication locally from other normal unicast traffic. Some embodiments facilitate this by encapsulating the original multicast packet before sending to the receiver/proxy endpoint. When a receiver/proxy endpoint receives the encapsulated packet, it decapsulates the packet and restores the original multicast packet. The encapsulation header in some embodiments includes a flag that tells the proxy the packet needs further local replication. In some embodiments, the sender/proxy endpoint converts the original multicast packet to a unicast packet and adds an IP option to the packet which contains the original destination multicast address.

If the data packet requires further replication by the endpoint, the process proceeds to 430. Otherwise, the process 400 identifies (at 480) the receiver for the data packet, sends (at 490) the data packet to the identified receiver and ends.

At 430, the process 400 identifies a multicast group for the data packet. In some embodiments, such information is derived or extracted from the received data packet. The process then identifies (at 440) endpoints that are to receive the data packet that belong to the identified multicast group. In some embodiments, the information that is needed by an endpoint to identify member endpoints of a multicast group is provided by a central entity that collects such information from endpoints in network and distributes it. In some embodiments, the endpoints in the network exchange such information amongst themselves beforehand. The collection and exchange of such information is described further in Section II below. An example of the information used by endpoints for identifying multicast group membership is described below by reference to FIG. 6.

Next, the process determines (at 450) whether any of the identified receiver endpoints are in the local segment. If so the process proceeds to 455 to replicate and forward the data packet to all identified receiver endpoints (of the identified multicast group) in the local segment. In some embodiments, the process 400 determines whether the local segment supports multicast. If so, the process uses multicast protocols to send the data packet to all members of the multicast group in the local segment. Otherwise, the process uses unicast protocols to send the data packet to each identified receiver endpoint individually.

The process then determines (460) whether any of the identified receiver endpoints are in remote segments. If so, the process proceeds to 470 to replicate and forward the data packet to the proxy endpoints for those remote segments. After sending the packet to receiver endpoints in the local segment and/or proxies for endpoints in the identified remote segments, the process 400 ends.

II. Information Collection and Exchange

In some embodiments, an endpoint performing multicast replication and forwarding as described above in Section I needs information about multicast group membership and physical network topology. A sender endpoint of a multicast group needs to know all the remote segments that have receivers of this group and at least one endpoint in each of these segments, so it can choose an endpoint per remote segment as the proxy.

In the unicast replication mode, when a sender or proxy endpoint is performing multicast by unicast replication (as described above by reference to FIG. 2), it needs to know the relevant information (such as addresses) of all the multicast group's local receiver endpoints to replicate the packet to each of them. An endpoint of course knows its own multicast group membership. In some embodiments, when a segment is an IP subnet or a set of subnets that can be derived from the IP prefix, an endpoint could calculate its own segment or another endpoint's segment from IP addresses. In some embodiments, endpoints in the network use a discovery protocol to determine each other's segment ID. In some embodiments, the segments IDs of endpoints are configured by network administrators.

To obtain all of the relevant information for multicast replication, endpoints in some embodiments exchange information with each other. In some embodiments, endpoints exchange information in a distributed way using a control plane protocol with each other. In some embodiments, a set of separate entities (e.g. centralized controllers) collect information from endpoints and publish (proactively or in response to queries from endpoints) to endpoints the information about the physical network and other endpoints that is needed for an endpoint to perform multicast replication.

Figure 5:
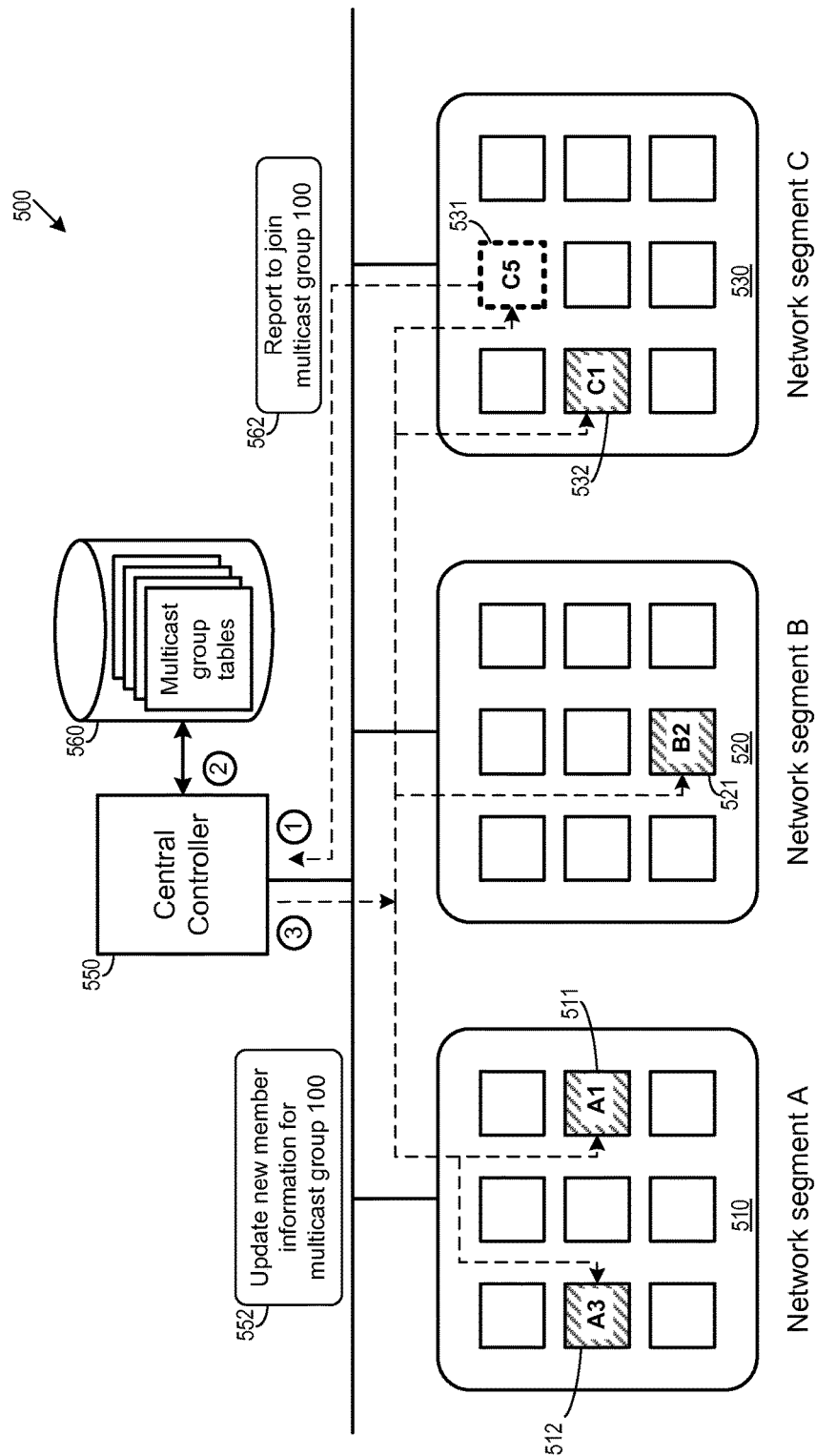
FIG. 5 illustrates the collection and distribution of endpoint information relevant to multicast replication.

FIG. 5 illustrates the collection and distribution of endpoint information relevant to multicast replication for some embodiments. Specifically, an endpoint that wishes to join a particular multicast group submits a report to a central controlling entity that collects information about the membership of the particular multicast group. The collected information is then distributed, either by query from the endpoints or by proactive push from the central controller, to each member of the particular multicast group.

FIG. 5 illustrates a network 500 that includes network segments 510, 520, and 530. The network includes endpoints that are members of a multicast group 100, which includes member endpoints 511, 512, 521, and 532 (illustrated as shaded). The endpoints 511 and 512 are in the segment 510 (endpoints A1 and A3 of segment A), the endpoint 521 is in the segment 520 (endpoint B2 of segment B), and the endpoint 532 is in the segment 530 (endpoint C1 of segment C). FIG. 5 also illustrates an endpoint 531 that is not initially in the multicast group 100. This endpoint 531 is in segment 530 (endpoint C5 of segment C).

FIG. 5 also illustrates an entity 550 for collecting and distributing information about the network from and to endpoints in the network. In some embodiments, the entity 550 is a central controller for all segments of the network. In some embodiments, the entity 550 includes one or more computing devices that collects information submitted from individual endpoints and stores the collected information as tables or directories 560 for different multicast groups. In some embodiments, the entity 550 receives and distributes such information through the physical infrastructure provided by the network 500. In some embodiments, the entity 550 communicates with individual endpoints through control plane protocols. In some other embodiments, the communication between the central entity 550 and the individual endpoints in different segments takes place in communication pathways that are independent of the network 500. In some embodiments, the entity 550 as the central controller selects a proxy for each endpoint for each multicast group based on the information it has collected. In some embodiments, the endpoints themselves select their own multicast proxies based on the information distributed to them by the entity 550.

FIG. 5 illustrates the endpoint 531 joining of the multicast group 100 in three operations. In some embodiments, an endpoint such as the endpoint 531 may decides to join a new multicast group (a receiver endpoint may join multiple multicast groups in some embodiments) after it has received a unicast packet that includes an original destination multicast group identification for the packet. The endpoint in some embodiments would thereby decide to join the multicast group based on the received multicast group identification by submitting a report to the entity 550.

During the first operation (labeled '1'), the endpoint 531 submits a report 562 to the central controller entities 550 that it wants to join the multicast group 100. In some embodiments, such a report includes an identifier for the desired multicast group, an identifier for the endpoint (e.g., its MAC address), as well as information for locating the endpoint within the network (e.g., its network IP address.)

During the second operation (labeled '2'), the central controller entity 550 updated its record for the multicast group 100 to include information for the endpoint 531 based on the received report 562. In some embodiments, the central controller entity maintains a directory or table for each multicast group. In some embodiments, the central controller resolves raw information submitted by individual endpoints and compile them into optimized table or directory for members of the multicast group. An example of such directories will be further described below by reference to FIG. 6.

During the third operation (labeled '3'), the central controller entity 550 distributes the updated member information 552 for the multicast group 100 to all members endpoints of the multicast group in different segments. Consequently, existing members 511, 512, 521, 532 knows that a new member endpoint 531 has just joined the multicast group, and that this new member endpoint is in segment C (530). The newly joined endpoint 531 also receives membership information regarding group 100 from the central controller, which lets it know about other existing members of the multicast group and their location (e.g., which segment) in the network.

Figure 6:
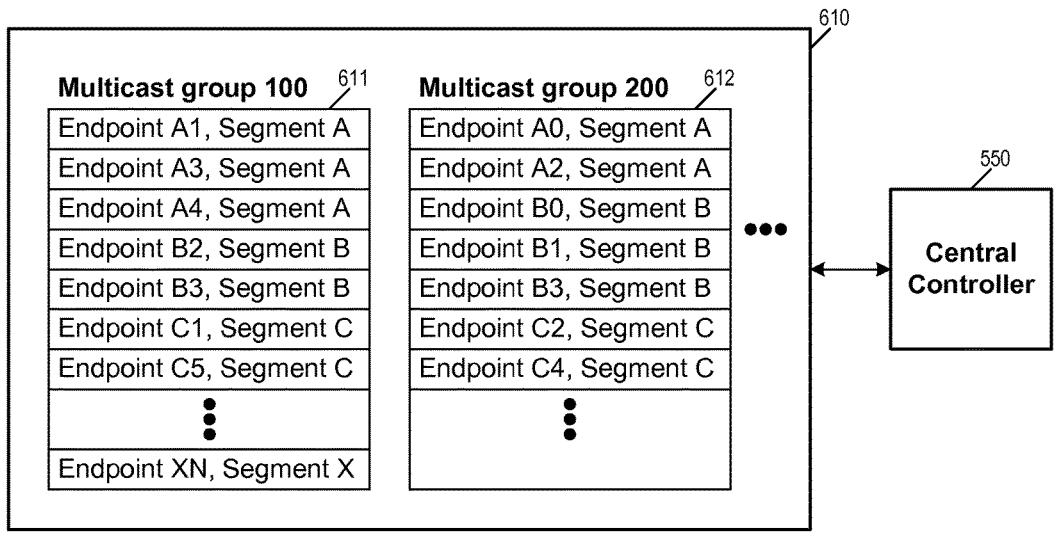
FIG. 6 illustrates a set of multicast information that is used by an endpoint for replicating and forwarding multicast traffic.
Figure 6:
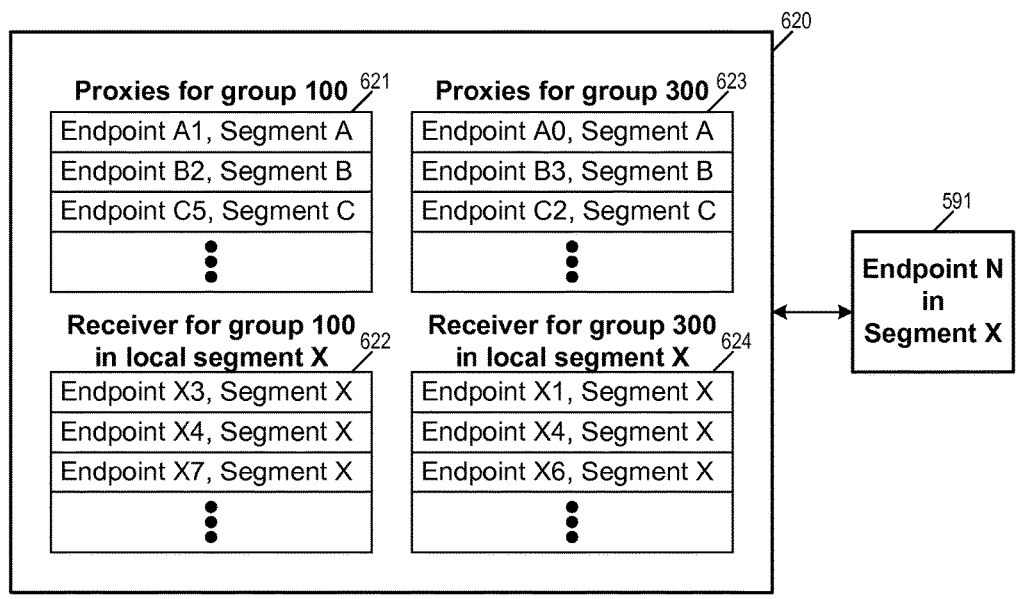

FIG. 6 illustrates an example directory 610 of multicast groups that is maintained by a central controlling entity such as 550 for some embodiments. The directory 610 maintains multiple tables, each table recording the membership information for one multicast group. For example, the table 611 stores the membership information for the multicast group "100", while the table 612 stores the membership information for the multicast group "200". Each table includes multiple entries, each entry corresponding to an endpoint in the multicast group. For example, each entry in table 611 records an identifier for an endpoint that is in the multicast group "100", while each entry in table 612 records an identifier for an endpoint that is in the multicast group "200". Each entry also includes the network segment that the endpoint belongs to. It is worth noting that an endpoint can belong to more than one multicast groups, for example, the endpoint 'B3' of segment 'B' belongs to both multicast groups 100 and 200 as it appears in both tables 611 and 612. According to the example directory 610, the multicast group 100 has added endpoints 'A4' and 'B3' since the operation illustrated in FIG. 5.

FIG. 6 also illustrates a set of multicast information that is used by an endpoint for replicating and forwarding multicast traffic. As illustrated, a set of multicast information 620 is used by an endpoint 591 in order to participate in multicast groups "100" and "300". The set of multicast information 620 includes a table 621 for identifying proxies in remote segments for multicast group "100", a table 622 for identifying other endpoints in local segment that are in multicast group "100", a table 623 for identifying proxies in remote segments for multicast group "300", and a table 624 for identifying other endpoints in local segment that are in multicast group "300". In some embodiments, the multicast information 620 used by the endpoint 591 is maintained by the endpoint 591 itself. In some embodiments, the multicast information is maintained by another entity in the network. In some embodiments, the endpoint 591 stores the multicast information.

Thus, when the endpoint 591 (identified as endpoint XN in a segment X of the network 500, not illustrated in FIG. 5) needs to replicate and forward a multicast data packet to multicast group 100, it uses the table 622 to identify all other endpoints that are in the multicast group 100 within the same segment X. Likewise, if the multicast data packet is for multicast group 300, the endpoint 591 uses the table 624 to identify all other endpoints that are in the multicast group 300 within the same segment X. The endpoint 591 then sends the data packet by multicast or unicast to each of those identified endpoints in segment X.

The endpoint 591 also uses the tables 622 and 624 to identify proxies for replicating multicast traffic in remote segments. Each entry in the table 622 and 624 corresponds to a remote segment and identifies an endpoint as the proxy for replicating multicast traffic from the endpoint 591 to that remote segment. It is worth noting that in some embodiments, for a same remote segment, an endpoint can have different proxies for different multicast groups. For example, for segment B, the endpoint 591 selects endpoint B2 as the proxy for multicast group "100" while selecting endpoint B3 as the proxy for the multicast group "300". It is also worth noting that, in some embodiments, an endpoint keeps track of only proxies in remote segments instead of maintaining information on all endpoints in all segments. It is further worth noting that in some embodiments, two endpoints in the same segment can select different proxies for replicating multicast traffic to a given remote segment.

In some embodiments, not only endpoints need information detailing the topology of the network (i.e., remote segments), switches and routers in the underlying physical network also need to discover and maintain a record of local receivers of a multicast group in order to forward multicast packets of that group to all the receiver endpoints. In some embodiments, IGMP is used for allowing an endpoint to join a multicast group as a receiver. Some embodiments use switches that feature IGMP snooping to learn multicast group membership from the received IGMP messages. In some embodiments, routers (or switches with layer 3 capabilities) act as IGMP querier that periodically sends out IGMP query messages to request receiver endpoints or downstream switches/routers to report multicast group membership information. In some embodiments, Routers run multicast routing protocols to exchange the multicast membership information and to define delivery paths of multicast packets across layer 3 networks. Some embodiments uses protocol such as PIM (Protocol Independent Multicast), DVMRP, or MOSPF.

In some embodiments, IGMP snooping is supported by switches while multicast routing is not supported by the routers. In some of these embodiments, there may be no IGMP querier in the segment. In this case, each receiver endpoint may periodically send out IGMP reports into the physical network for the multicast groups it joins to keep the multicast forwarding entries in the switches alive, even if it never receives an IGMP query.

Is some embodiments, the multicast island forms a tree topology, and each router (or layer 3 switch) in the tree queries and snoops multicast membership from its downstream interfaces through IGMP and proxies IGMP to its upstream node. In some of these embodiments, a multicast routing protocol is not running among different segments, so multicast traffic could not be routed across segments. Some embodiments runs a multicast routing protocol such as PIM in only a part of the whole IP network, isolated in some individual segments.

III. Proxy Selection and Load Balancing

As mentioned, a sender endpoint in some embodiments needs to choose a proxy in every remote receiving segment to replicate a multicast packet. Each sender endpoint can make the proxy choices independently based on different strategies. For example, a sender endpoint in some embodiments chooses a fixed proxy in every segment for all multicast traffic. Alternatively, a sender endpoint in some embodiments chooses a fixed proxy per multicast group in every segment. In some other embodiments, the sender chooses a fixed proxy per multicast flow (e.g. identified by the <source IP, destination IP, protocol>, or <source IP, destination IP, source port, destination port> for UDP) in every segment.

These different methods of proxy selection in some embodiments are able to balance the network traffic load among different endpoints of a segment. In some embodiments, a sender endpoint uses "heartbeat" communication from the proxies it has chosen to detect proxy failures. Some embodiments detect endpoint failures by separate control plane implementations.

In some embodiments, a sender can choose any endpoint in a remote segment to be the proxy. In some of these embodiments, an endpoint chooses one of the receiver endpoints in the remote segment for each specific multicast group. Doing so has the advantage of minimizing the impact by one multicast group over other multicast groups and other types of network data traffic (since this makes it less likely that an endpoint has to handle multicast traffic for multicast groups that the endpoint is not a receiver of). It also has the advantage of minimizing the interference upon the physical network's multicast forwarding states. In some embodiments, the choice of proxy is determined by control plane implementation (i.e., central controller such as 550), which in some embodiments may choose not to provide information on all of the endpoints in remote segments. In some of these embodiments, the central controller assigns specific proxies to each endpoint rather than letting each endpoint decides for itself.

Figure 7B:
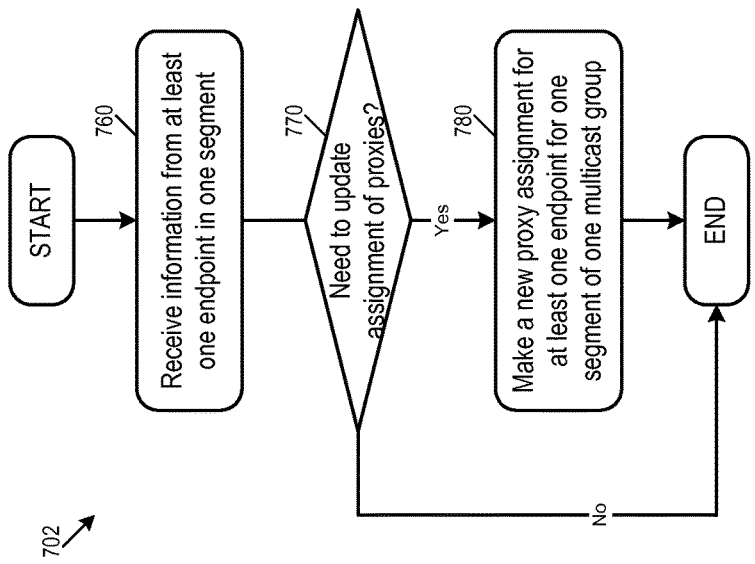
FIGS. 7a-b conceptually illustrate processes for selecting multicast proxies in remote segments.
Figure 7A:
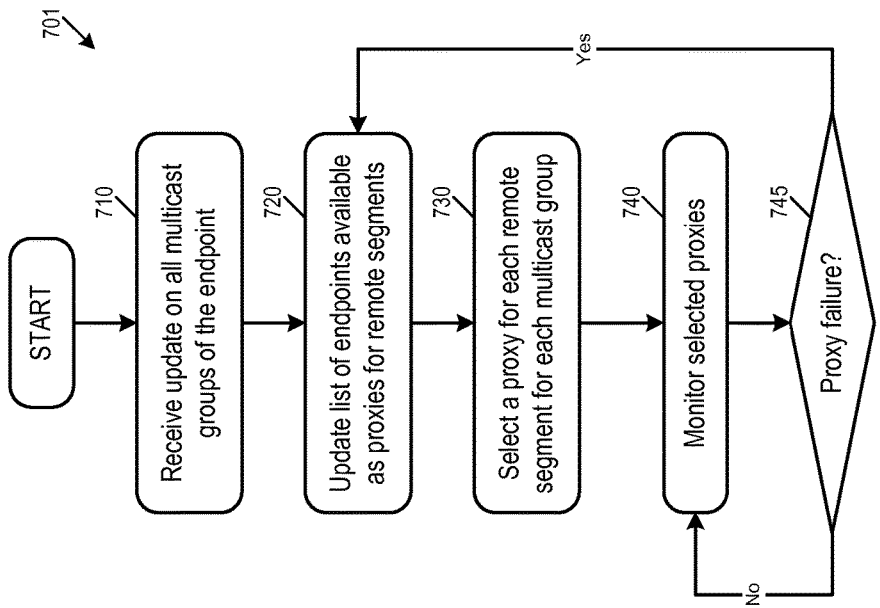

Different embodiments select proxies differently. FIG. 7*a* illustrates a distributive process performed by individual endpoints while FIG. 7*b* illustrates a centralized process performed by a central controller. For some embodiments, FIG. 7*a* conceptually illustrates a process 701 performed by an endpoint for selecting multicast proxies in remote segments. The process starts when it receives (at 710) update on the membership of all multicast groups that this endpoint belongs to. In some embodiments, the endpoint receives the updated information from a central controller as discussed above by reference to FIG. 5.

The process then updates (at 720) a list or pool of endpoints that are available to serve as proxies for each of the remote segments. In some embodiments, this list or pool of potential proxies is based on the information received from the central controller. In some embodiments, this list is based on the exchange of information (such as heartbeat) between this endpoint and other endpoints.

Next, the process selects (at 730) a proxy for each remote segment for each multicast group. In some embodiments, this selection process is performed in a manner that balances the network traffic load in the remote segments. In some embodiments, this is accomplished by choosing an endpoint from the pool by random for each multicast group. Some embodiments perform proxy selection intelligently by intentionally avoiding endpoints that are already busy (because of e.g., multicast traffic of other multicast groups, or other types of network traffic).

The process then monitors (at 740) the endpoints selected as proxies and determines (at 745) whether there is a proxy failure (e.g., by heartbeat). If so the process 701 returns to 720 to update the list of available endpoints as proxies by removing the failed endpoint from the pool and to select a replacement proxy. Otherwise the process returns to 740 to continue monitoring the selected proxies.

FIG. 7b conceptually illustrates a process 702 for proxy selection performed by a central controller (such as 550) for some embodiments. The process 702 starts when it receives (at 760) updated information from at least one endpoint in one of the segments.

The process then determines (at 770) whether the assignment of proxies needs updating. Some embodiments decide to make new proxy assignment when there is an endpoint that just joined the multicast group (hence available to serve as a proxy) or when an endpoint has failed. Other events in the network can also cause the process to make new proxy assignments, such as when performance degradation due to imbalance in the traffic load has been detected. If there is a need to update assignment of proxies, the process proceeds to 780. Otherwise, the process 702 ends.

At 780, the process makes a new proxy assignment for at least one endpoint for one segment of one multicast group. As in the case for proxy selection performed by endpoints, a centrally performed proxy selection in some embodiments also uses random selection from a pool of available endpoints for load balancing. Some embodiments perform proxy selection intelligently by intentionally avoiding endpoints that are already busy (because of e.g., multicast traffic of other multicast groups, or other types of network traffic). After making the new proxy assignment, the process 702 ends.

IV. Network Virtualization

In some embodiments, multicast replication methods as described above are used to implement overlay based network virtualization solutions such as VXLAN. In an overlay network, logical layer 2 networks may be created on top of the physical network, and full messed layer 2 tunnels may be established between endpoints that join a same logical layer 2 network. In some embodiments, a BUM packet originating from one tunnel endpoint in the logical layer 2 network is replicated to all other member endpoints of the logical network.

In some embodiments, VMs are consumers of the logical layer 2 networks, and hypervisors are tunnel endpoints. Some of these embodiments map the scope of a multicast replication operation (i.e., a multicast group) to a logical layer 2 network and multicast endpoints to tunnel endpoints. As such, BUM packet replication in a logical network is implemented as multicast replication to a multicast group in the physical network. In other words, the replication scope of a logical network in these embodiments is mapped to include only the receiver endpoints of a multicast group. In some embodiments, the hypervisors include managed network switches whose forwarding operations are managed by controllers.

Figure 8:
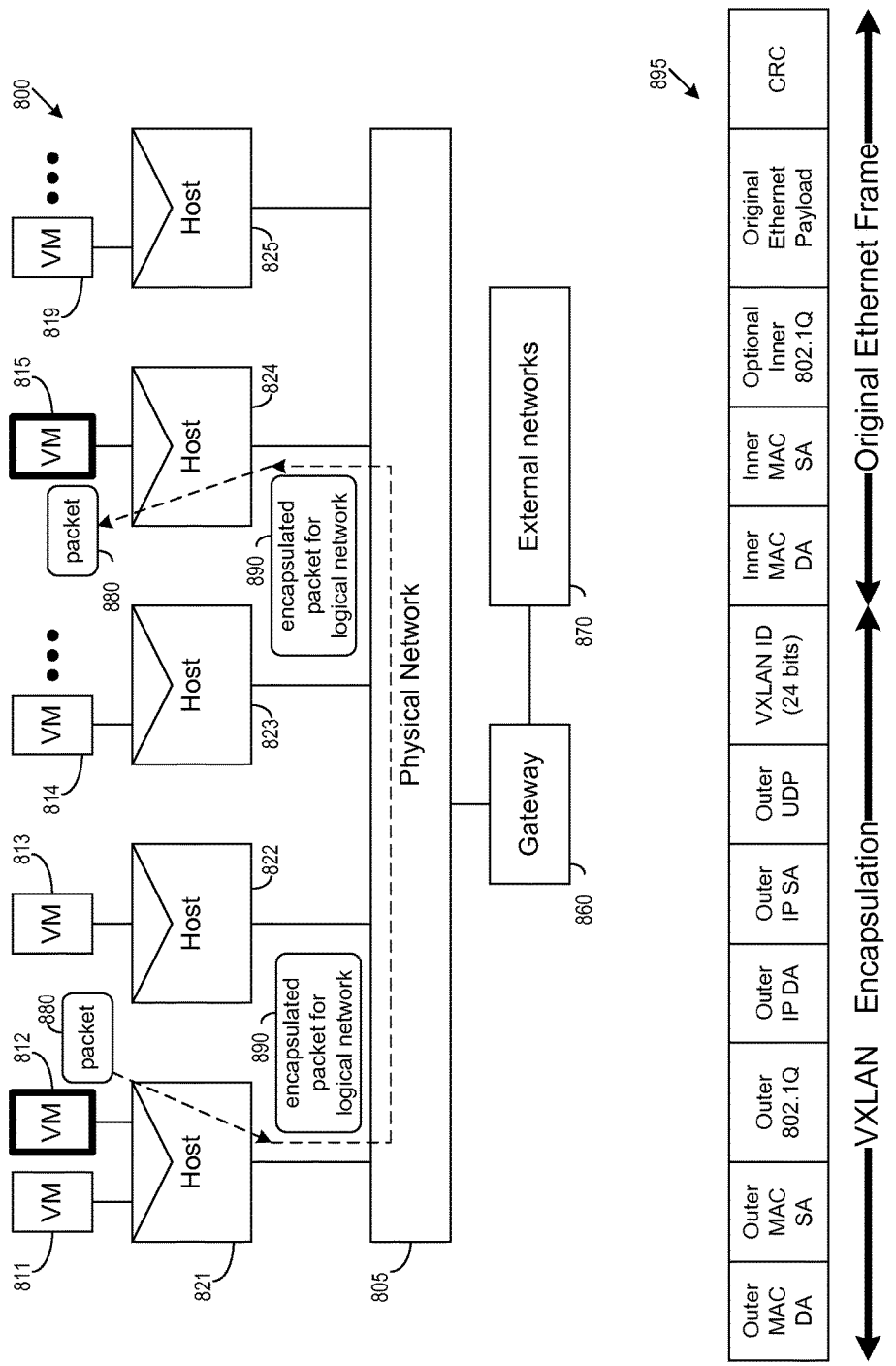
FIG. 8 illustrates network virtualization of a logical network over a physical network.

FIG. 8 illustrates the network virtualization of a logical network 800 over a physical network 805. The logical network 800 is for data communication among VMs 811-819, which are running on host machines 821-825 via hypervisors running on those host machines. The host machines are communicatively connected to the physical network 805.

The physical network 805 is in some embodiments, similar to the network 100 of FIG. 1. In other words, the physical network 805 may include one or more network segments, and that the host machines (or the hypervisors running on those host machines) are endpoints connected to different segments of the network. The physical network is capable of supporting multicast traffic, whether by utilizing built-in multicast capabilities provided by some parts of the physical network (e.g., multicast island) or by performing unicast across parts of the network that do not support multicast (e.g., data centers and provider networks). The physical network is also able to communicate with external networks 870 via a gateway 860.

The network virtualization of FIG. 8 is accomplished by encapsulating data packets that are generated by VMs for delivery in the physical network. As illustrated, the VM 812 running on host machine 821 is sending a data packet 880 to VM 815 running on host machine 824. The host machine 821 creates an encapsulated packet 890 based on the data packet 880, and the physical network 805 delivers the encapsulated packet 890 to the host machine 824. The host machine 824 in turn decapsulates the received packet 890 and delivers the decapsulated packet 880 to the destination VM 815.

In some embodiments, the encapsulated data packet 890 is created according to a network virtualization standard such as VXLAN. FIG. 8 illustrates an example encapsulation format 895 for the data packet 890 according to VXLAN. VXLAN is an overlay network technology which could support fast provisioning of a large number of logical layer 2 networks over physical layer 3 networks. VXLAN is based on MAC-over-UDP solution. Ethernet frames of a VXLAN logical network are encapsulated using UDP on the physical wire. In the VXLAN header there is a 24-bit VNI (VXLAN network identifier) which uniquely identifies a VXLAN logical layer 2 network, so up to 16M logical networks are supported.

VXLAN encapsulation is done by VTEP (VXLAN tunnel endpoint), which is a hypervisor (or the vSwitch on the hypervisor), while VMs are users of VXLAN networks. When a VM on one VTEP sends an ethernet frame to another VM in the same VXLAN network but on a different VTEP, the source VTEP will encapsulate the fame before injecting it to the physical network, using the source VTEP's IP address to be the source IP in the outer header and the VXLAN network's VNI. The destination VTEP decapsulates the packet and forwards only the original inner frame to the destination VM. For a normal unicast frame (whose destination MAC is known to the source VTEP), the destination VTEP's IP address will be used as the outer destination IP. A VTEP should maintain the VM MAC—VTEP IP mapping of the VXLAN networks that its VMs connect to, typically through traffic learning or some kinds of control plane implementation.

For BUM traffic, VXLAN leverages IP multicast. Each VXLAN network is allocated a physical multicast group. A BUM frame is encapsulated using the VXLAN network's multicast IP to be the outer destination IP. A VTEP should join the multicast groups of the VXLAN networks on it, typically by sending out IGMP reports to the physical network.

Figure 9:
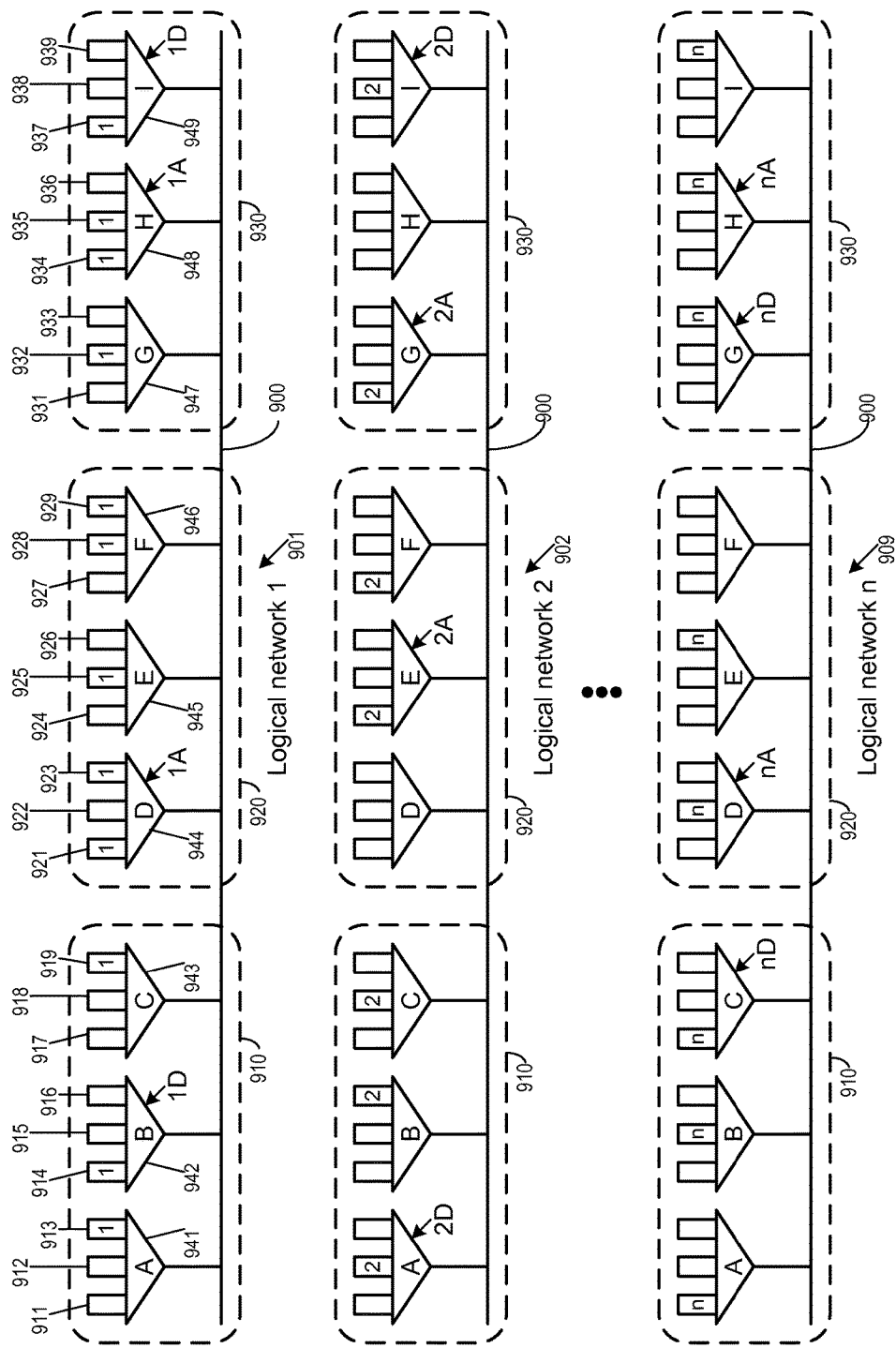
FIG. 9 illustrates the implementation of multiple logical networks over a physical network capable of performing multicast replication/forwarding across multiple network segments.

For some embodiments, FIG. 9 illustrates the implementation of multiple logical networks (e.g., VXLAN logical networks) over a physical network 900 capable of performing multicast replication/forwarding across multiple network segments. The logical networks are for data communication between VMs running over hypervisors in host machines. These hypervisors are the endpoints of the physical network 900 and function as tunnel endpoints of the logical networks.

The physical network 900 has at least three segments 910, 920, and 930. The segment 910 includes hypervisors 941-943 (hypervisors A, B, C). The segment 920 includes hypervisors 944-946 (hypervisors D, E, and F). The segment 930 includes hypervisors 947-949 (hypervisors G, H, and I). The hypervisor A is running VMs 911-913, the hypervisor B is running VMs 914-916, the hypervisor C is running VMs 917-919, the hypervisor D is running VMs 921-923, the hypervisor E is running VMs 924-926, the hypervisor F is running VMs 927-929, the hypervisor G is running VMs 931-933, the hypervisor H is running VMs 934-936, and the hypervisor I is running VMs 937-939.

Network virtualization allows the physical network 900 to simultaneously support multiple logical networks 901-909. VMs 913, 914, 919, 921, 923, 925, 928, 929, 932, 934, 935, and 937 are in the logical network 901 (logical network '1'). VMs 912, 916, 918, 924, 927, 931, and 938 are in the logical network 902 (logical network '2'). VMs 911, 915, 917, 922, 926, 933, 936, and 939 are in the logical network 909 (logical network 'n'). Each of the logical networks 901-909 is mapped to a multicast group in the physical network 900. Each of these mapped multicast groups is used to handle the BUM traffic of the corresponding logical network.

In some embodiments, the hypervisors are the endpoints of the physical network 900. In some of these embodiments, it is the hypervisors that perform the tasks of replicating and forwarding multicast packets, and it is the hypervisors that act as the proxies for the various multicast groups (i.e., logical networks) in different network segments on behalf of other hypervisors. In some embodiments, it is also the hypervisors, as endpoints of the network 900, that join multicast groups in order to establish logical networks. In some of these embodiments, a hypervisor joins a multicast group by reporting to a central controller entity, receives multicast group membership information, and selects proxies for replicating and forwarding multicast packets to different segments. In some embodiments, a hypervisor joins a particular multicast group when at least one of its VMs wants to connect to a logical network that uses the particular multicast group.

As illustrated, for the logical network 901 (logical network '1'), the hypervisor B has been selected by hypervisor D as the proxy of segment 910, the hypervisor D has been selected by hypervisor A as the proxy of segment 920, and the hypervisors H and I have been respectively selected by hypervisors A and D as the proxy of segment 930. For the logical network 902 (logical network '2'), the hypervisor A has been selected by hypervisor D as the proxy of segment 910, the hypervisor E has been selected by hypervisor A as the proxy of segment 920, the hypervisors G and I have been respectively selected by hypervisors A and D as the proxy of segment 930. For the logical network 909 (logical network 'n'), the hypervisor C has been selected by hypervisor D as the proxy of segment 910, the hypervisor D has been selected by hypervisor A as the proxy of segment 920, the hypervisors G and H have been respectively selected by hypervisors D and A as the proxy of segment 930.

It is worth noting that, in some embodiments, a hypervisor can support multiple VMs belonging to different logical networks (such as the hypervisor A, which operates VMs in logical networks 1, 2 and n). Additionally, a hypervisor can be the proxy for multiple hypervisors in a same multicast group or different multicast groups, though proxy selection process in some embodiments would seek to assign proxies in a way that balances network traffic load.

Figure 10:
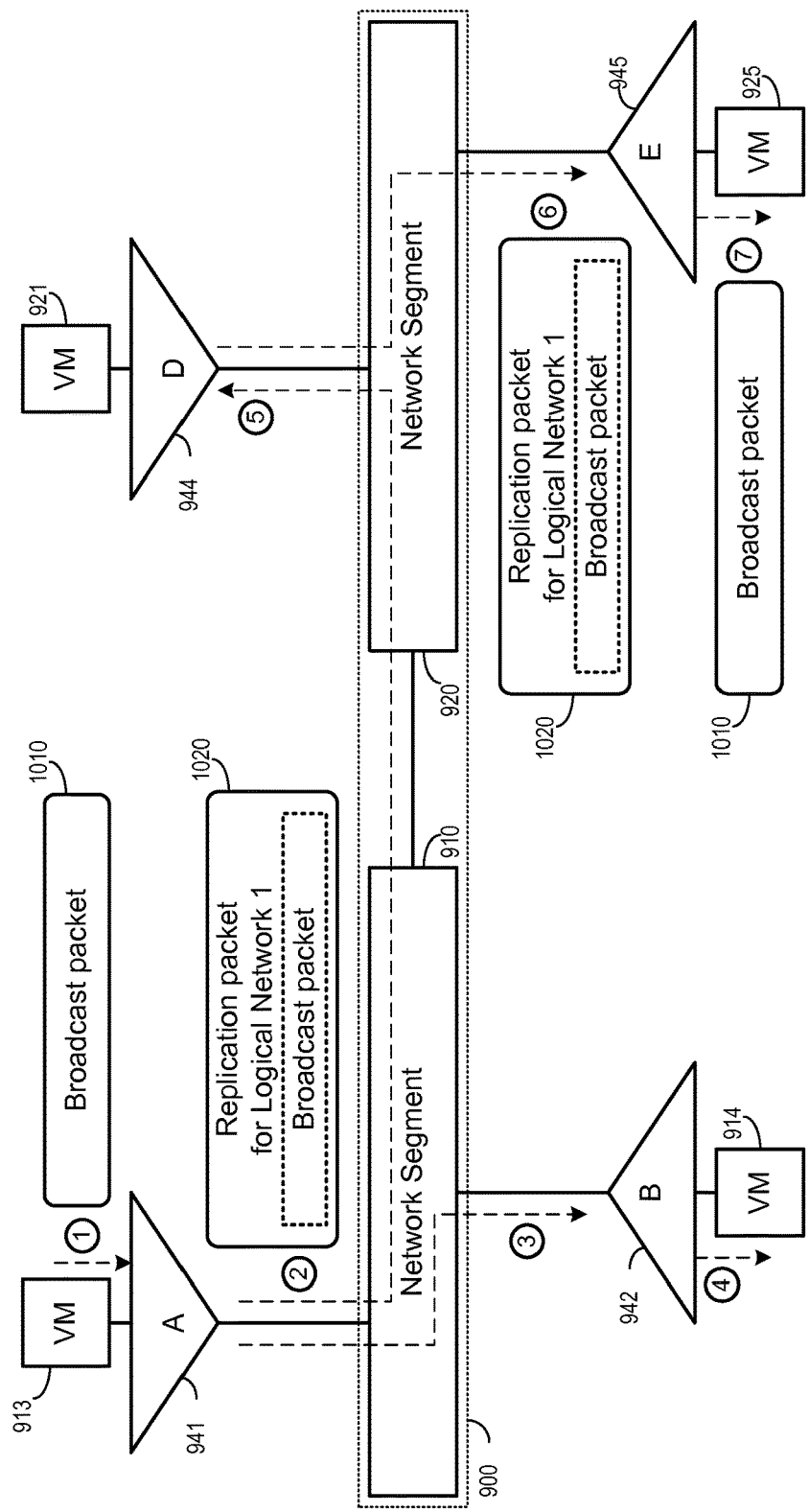
FIG. 10 illustrates the transmission of a BUM packet in a logical network by using multicast proxies in the physical network.

FIG. 10 illustrates the transmission of a BUM packet in a logical network by using multicast proxies in the physical network. The figure illustrates the delivery of a broadcast packet 1010 from the VM 913 to the VM 925 over the logical network 901. As discussed above by reference to FIG. 9, the logical network 901 (i.e., logical network 1) is implemented over the physical network 900, which includes network segments 910 and 920. The hypervisor A (941), which is running the VM 913, is on the network segment 910. The hypervisor E (945), which is running the VM 925, is on the network segment 920. Since the VM 913 is running on a hypervisor that is on a different segment than the hypervisor running the VM 925, the logical network 901 would send the packet 1010 to its destination by using multicast proxies. As illustrated in FIG. 9 and in FIG. 10, hypervisor A has chosen the hypervisor D (944) as its proxy in the segment 920 for the logical network 901 (and its corresponding multicast group).

FIG. 10 shows the transmission of the BUM packet from the VM 913 to the VM 925 in seven operations. During the first operation (labeled '1'), the VM 913 generates a broadcast packet 1010 for all members of the logical network 901. An example of such a broadcast packet is an ARP query for MAC address of other VMs on the logical network. In some embodiments, this original packet includes the MAC address assigned to the VM 913.

During the second operation (labeled '2'), the VM hypervisor encapsulates the broadcast packet 1010 into an encapsulated packet 1020. In some embodiments, this encapsulation includes an identifier for the logical network that is appended by the hypervisor A. In some embodiments, the hypervisor A also appends its own IP address as part of the encapsulated packet. In some embodiments, this encapsulation is in a format specified by a network virtualization protocol such as VXLAN as discussed above by reference to FIG. 8.

During the third operation (labeled '3'), the hypervisor A replicates and forwards the packet encapsulated for the logical network 901 to other VMs running on hypervisors of local network segment 910. For example, the VM 914 running on the hypervisor B (942) is also on the network segment 910, and hence the hypervisor A replicate and forward the encapsulated packet 1020 to the hypervisor B. The hypervisor B in the fourth operation (labeled '4') in turn decapsulates the packet 1020 and delivers the original broadcast packet to the VM 914. In some embodiments, a sender endpoint such as hypervisor A leverages IP multicast capability offered by the network segment 910 and replicates the encapsulated packet by local multicast to multiple recipients at the same time. In some embodiments, a hypervisor uses unicast to accomplish multicast forwarding within a segment when multicast forwarding is not available in the underlying physical network.

During the fifth operation (labeled '5'), the hypervisor A replicates and forwards the encapsulated packet 1020 to remote segments. Specifically, for the remote segment 920, the hypervisor A forwards the packet 1020 to the chosen proxy hypervisor D (944). The proxy hypervisor D in turn in the sixth operation (labeled '6') replicates and forwards the packet that it received from hypervisor A to other hypervisors in segment 920 that belong to the same multicast group (i.e., logical network 901). One of these recipients is hypervisor E (945). In some embodiments, a proxy endpoint such as hypervisor D leverages IP multicast capability offered by the network segment 910 and replicates the encapsulated packet by local multicast to multiple recipients at the same time. In some embodiments, a proxy hypervisor uses unicast to accomplish multicast forwarding within its segment when multicast forwarding is not available in the underlying physical network.

During the seventh operation (labeled '7'), the hypervisor E decapsulates the received packet and sends the VM 925 the decapsulated packet 1010. In this example, the proxy hypervisor D has its own VM 921 that belongs to the same logical network and will also receive the decapsulated packet. However, in some embodiments, an endpoint chosen as a proxy for a particular multicast group/logical network may not be a hypervisor, or may be a hypervisor that does not have a VM that operates in that particular logical network. In these instances, the proxy would not consume the received multicast traffic itself.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
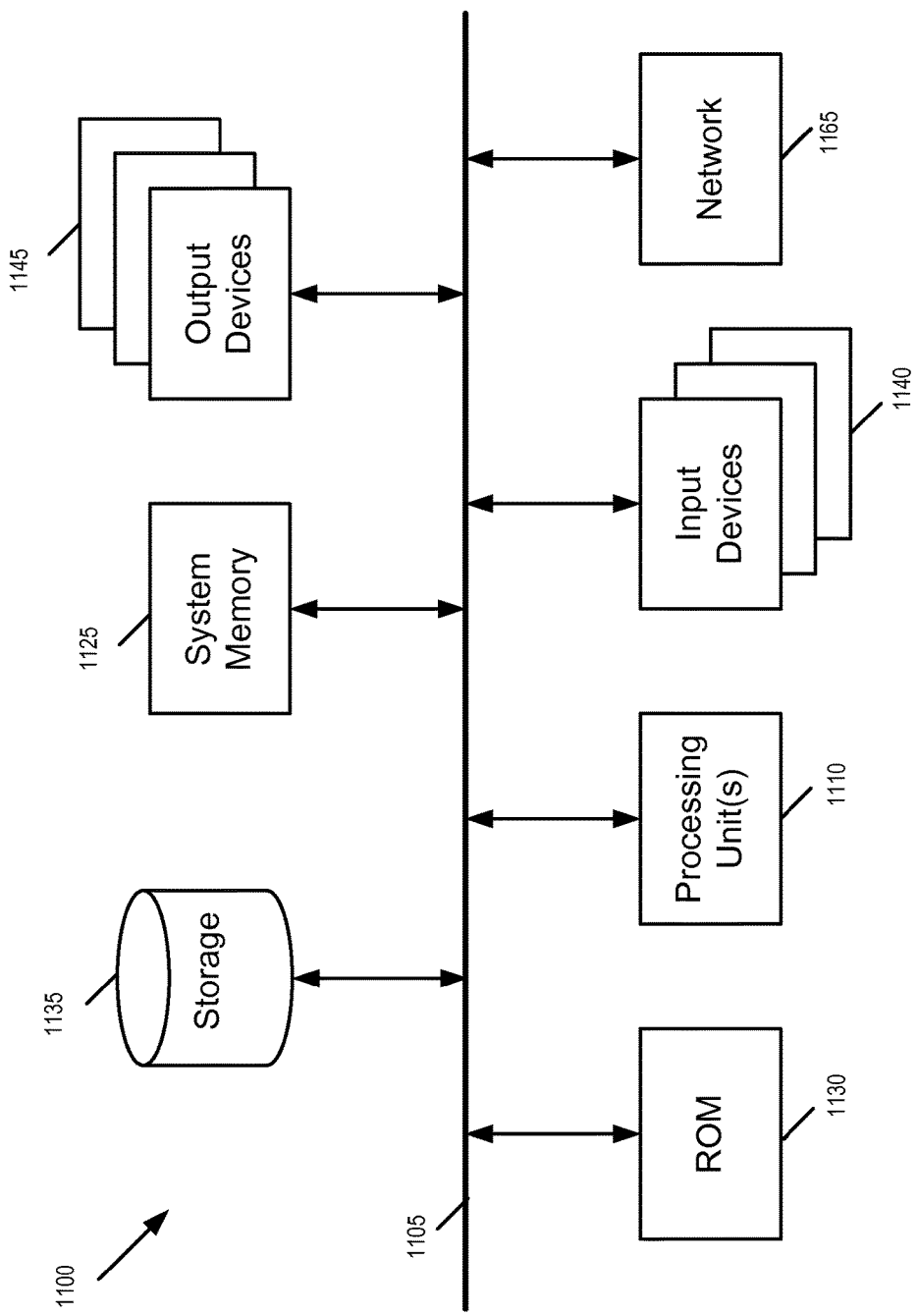
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4 and 7a-b) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for operating logical networks over a physical network comprising a plurality of physical network segments, the method comprising:
   identifying a plurality of logical networks implemented in the physical network; and
   replicating Broadcast, Unknown Unicast, or Multicast (BUM) packets for the plurality of logical networks by using a plurality of tunnel endpoints as replication proxies,
   wherein each particular logical network has one tunnel endpoint designated as its replication proxy in a first segment of the physical network to receive a packet belonging to the particular logical network from a second segment of the physical network and to replicate the packet to other tunnel endpoints in the first segment, and
   wherein at least two of the logical networks use different tunnel endpoints in the first segment as replication proxies.

2. The method of claim 1, wherein first and second logical networks use a same tunnel endpoint in the particular segment as replication proxies.

3. The method of claim 1,
   wherein each tunnel endpoint operates in a hypervisor of a host machine, and
   wherein the different tunnel endpoints in the first segment used by the at least two logical networks operate on different host machines.

4. The method of claim 1, wherein the particular segment of the network is a multicast island.

5. The method of claim 1, wherein the logical networks are overlay networks.

6. The method of claim 1, wherein at least one of the logical networks is operating as a VXLAN network.

7. The method of claim 1, wherein each logical network is mapped to a multicast group.

8. The method of claim 1, wherein the tunnel endpoints that serve as replication proxies in a particular physical network segment are randomly selected from a pool of tunnel endpoints in the particular physical network segment.

9. The method of claim 1, wherein the tunnel endpoints that serve as replication proxies in a particular segment are selected based on network load.

10. The method of claim 1, wherein the physical network does not support multicast traffic from a network node outside of the first segment to a network node inside the first segment.

11. The method of claim 1, wherein a particular tunnel endpoint acting as a replication proxy receives a multicast packet for a particular logical network and forwards the multicast packet to endpoints for the particular logical network within the first segment as unicast packets.

12. The method of claim 1, wherein a particular tunnel endpoint acting as a replication proxy receives a multicast packet for a particular logical network and uses multicast forwarding to forward the packet to endpoints for the particular logical network within the first segment.

13. The method of claim 1, wherein each logical network has one tunnel endpoint designated as its replication proxy in each of the physical network segments.

14. A non-transitory machine readable medium storing a computer program that is executable by at least one processing unit, the program for operating logical networks over a physical network comprising a plurality of physical network segments, the program comprising sets of instructions for:
   identifying a plurality of logical networks implemented in the physical network; and
   replicating Broadcast, Unknown Unicast, or Multicast (BUM) packets for the plurality of logical networks by using a plurality of tunnel endpoints as replication proxies,
   wherein each particular logical network has one tunnel endpoint designated as its replication proxy in a first segment of the physical network to receive a packet belonging to the particular logical network from a second segment of the physical network and to replicate the packet to other tunnel endpoints in the first segment, and
   wherein at least two of the logical networks use different tunnel endpoints in the first segment as replication proxies.

15. The non-transitory machine readable medium of claim 14, wherein first and second logical networks use a same tunnel endpoint in the particular segment as replication proxies.

16. The non-transitory machine readable medium of claim 14, wherein the particular segment of the network is a multicast island.

17. The non-transitory machine readable medium of claim 14, wherein the physical network does not support multicast traffic from a network node outside of the first segment to a network node inside the first segment.

18. The non-transitory machine readable medium of claim 14, wherein a particular tunnel endpoint acting as a replication proxy receives a multicast packet for a particular logical network and forwards the multicast packet to endpoints for the particular logical network within the first segment as unicast packets.

19. The non-transitory machine readable medium of claim 14, wherein a particular tunnel endpoint acting as a replication proxy receives a multicast packet for a particular logical network and uses multicast forwarding to forward the packet to endpoints for the particular logical network within the first segment.

20. The non-transitory machine readable medium of claim 14, wherein each logical network has one tunnel endpoint designated as its replication proxy in each of the physical network segments.

* * * * *